United States Patent [19]

Perazzolo

[11] Patent Number: 5,615,471
[45] Date of Patent: Apr. 1, 1997

[54] MACHINE FOR MACHINING SHEET METAL

[75] Inventor: Eugenio Perazzolo, Rovigo, Italy

[73] Assignee: Rainer S.r.l., Calderara Di Reno, Italy

[21] Appl. No.: 362,410

[22] Filed: Dec. 23, 1994

[30] Foreign Application Priority Data

Dec. 24, 1993 [IT] Italy ................. BO93A0527

[51] Int. Cl.⁶ ........................................... B23P 23/04
[52] U.S. Cl. ................... 29/560; 29/33 J; 83/552
[58] Field of Search .............. 29/560, 33 J, 26 A; 408/130; 83/552, 549; 72/442, 414

[56] References Cited

U.S. PATENT DOCUMENTS

| | | | |
|---|---|---|---|
| 3,788,760 | 1/1974 | Daniels | 408/130 |
| 4,412,469 | 11/1983 | Hirata et al. | 83/552 |
| 4,532,845 | 8/1985 | Jinnuchi | 83/552 |
| 4,658,688 | 4/1987 | Saah et al. | 83/552 |
| 4,761,100 | 8/1988 | Maillard | 29/560 X |
| 4,976,180 | 12/1990 | Otto | 83/552 X |
| 5,001,627 | 3/1991 | Nakagawa | 29/560 |
| 5,072,620 | 12/1991 | Hill et al. | 72/414 |
| 5,076,127 | 12/1991 | Otto et al. | 83/549 X |
| 5,259,100 | 11/1993 | Takahashi | 29/33 J |

FOREIGN PATENT DOCUMENTS 5200453  8/1993  Japan ........................ 83/552

*Primary Examiner*—William R. Briggs
*Attorney, Agent, or Firm*—Finnegan, Henderson, Farabow, Garrett and Dunner, L.L.P.

[57] ABSTRACT

A machine for machining sheet metal and presenting:
- a multiple-tool assembly fitted with a number of tools arranged in a ring about a vertical axis;
- a multiple-die assembly fitted with a number of dies arranged in a ring about a vertical axis;
- a work station presenting a hammer movable along a vertical axis; and
- a carriage for moving the sheet.

The main characteristic of the present invention is that the work station presents a striker
- for transmitting to the work tool the pressure exerted by the hammer; and a device for rotating the work tool about is longitudinal axis.

13 Claims, 8 Drawing Sheets

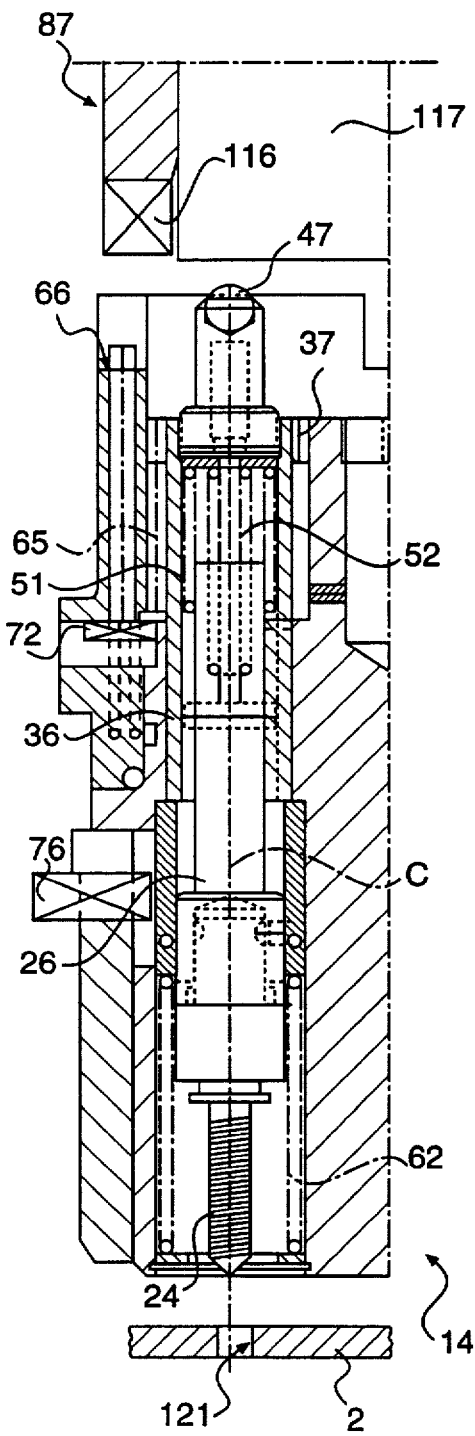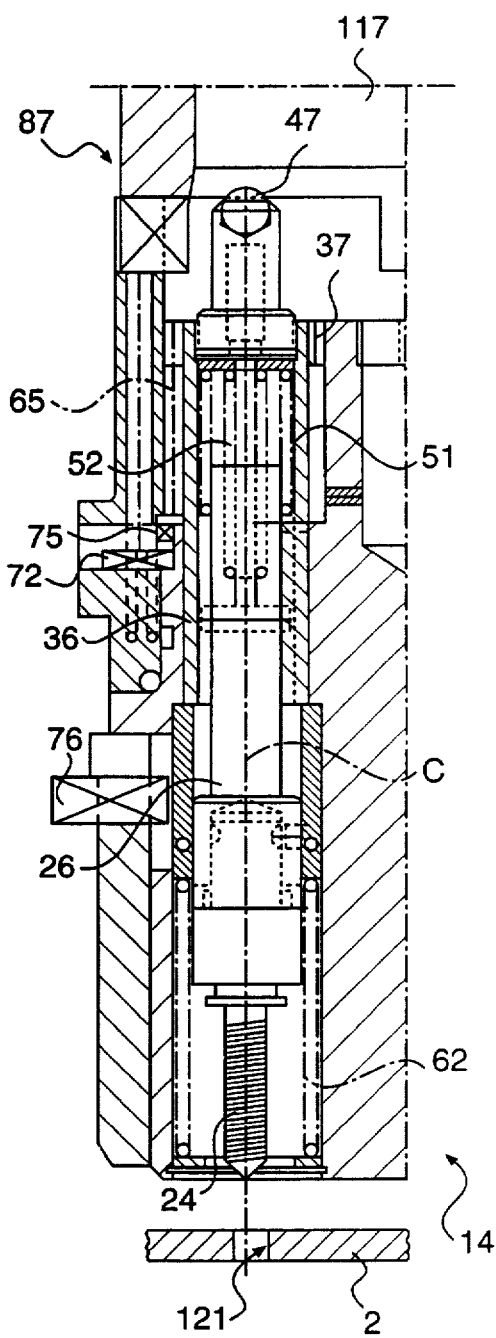
FIG. 5  FIG. 6

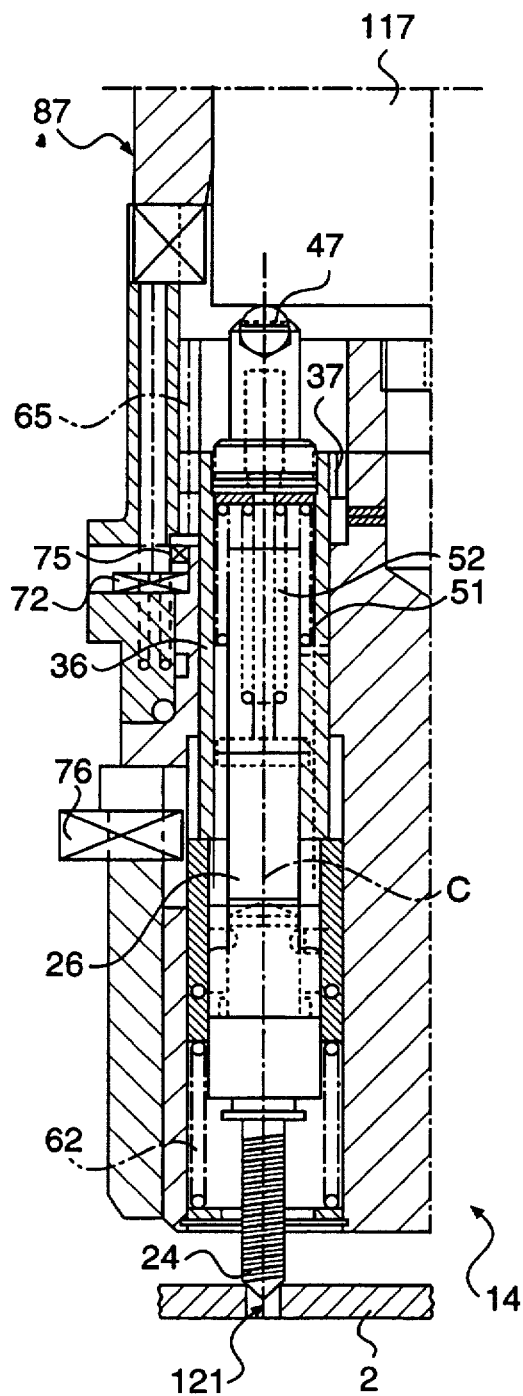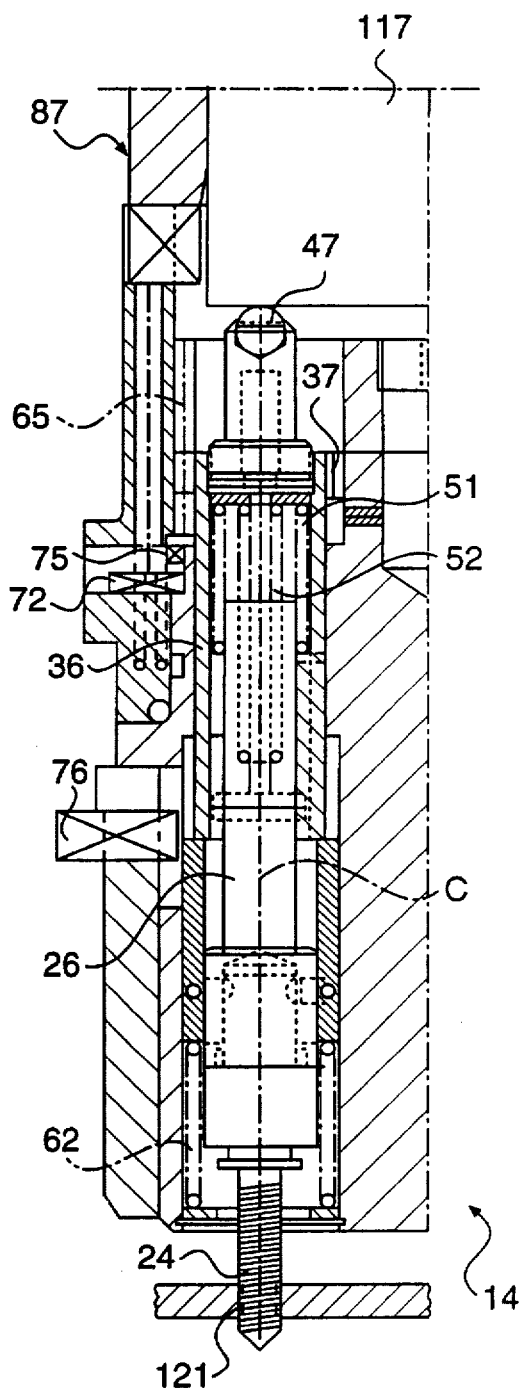
FIG. 7     FIG. 8

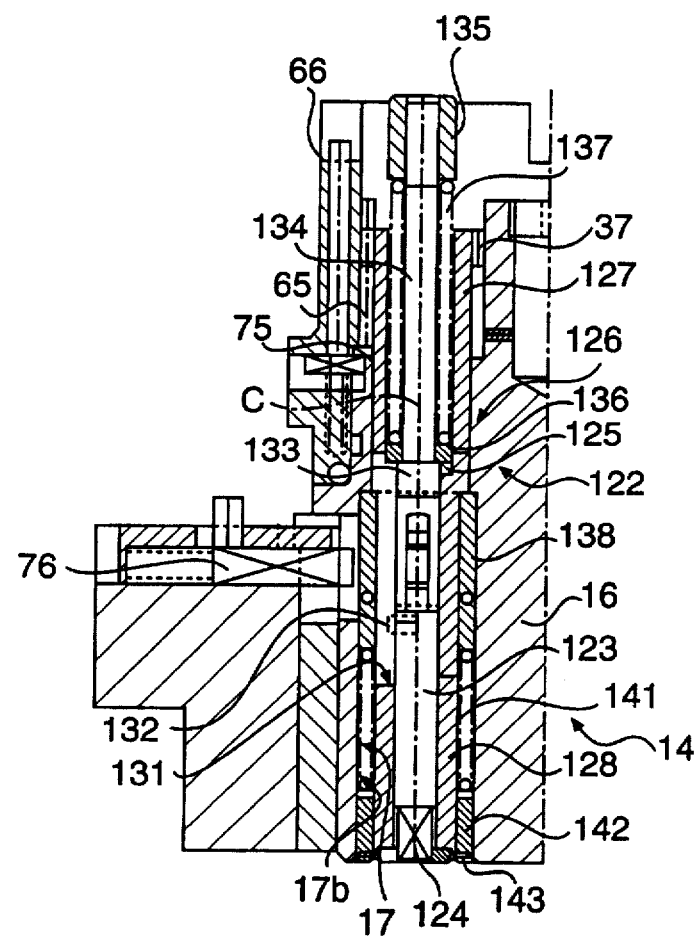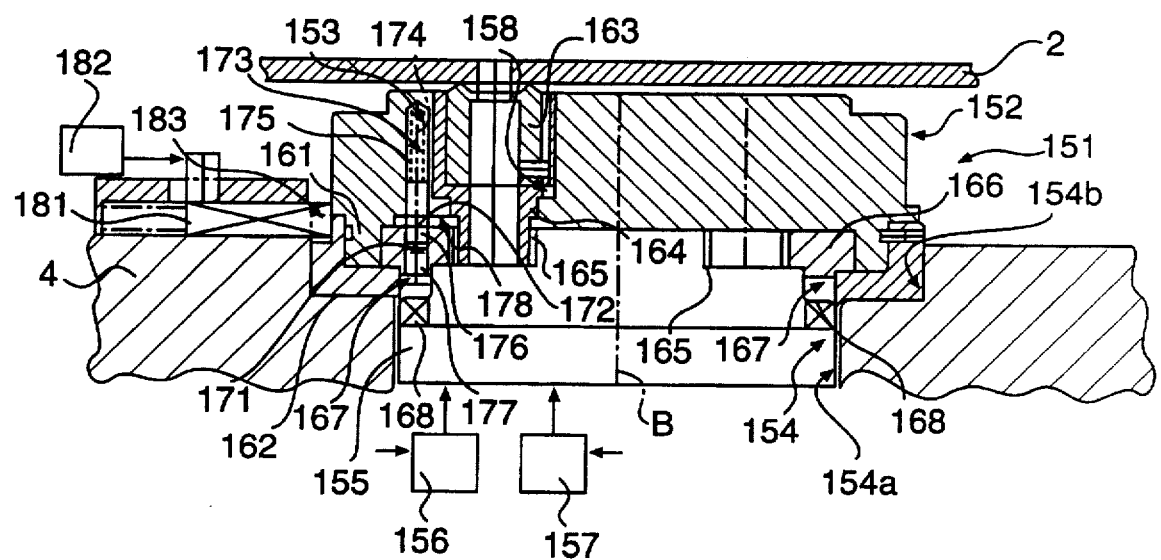
FIG. 9

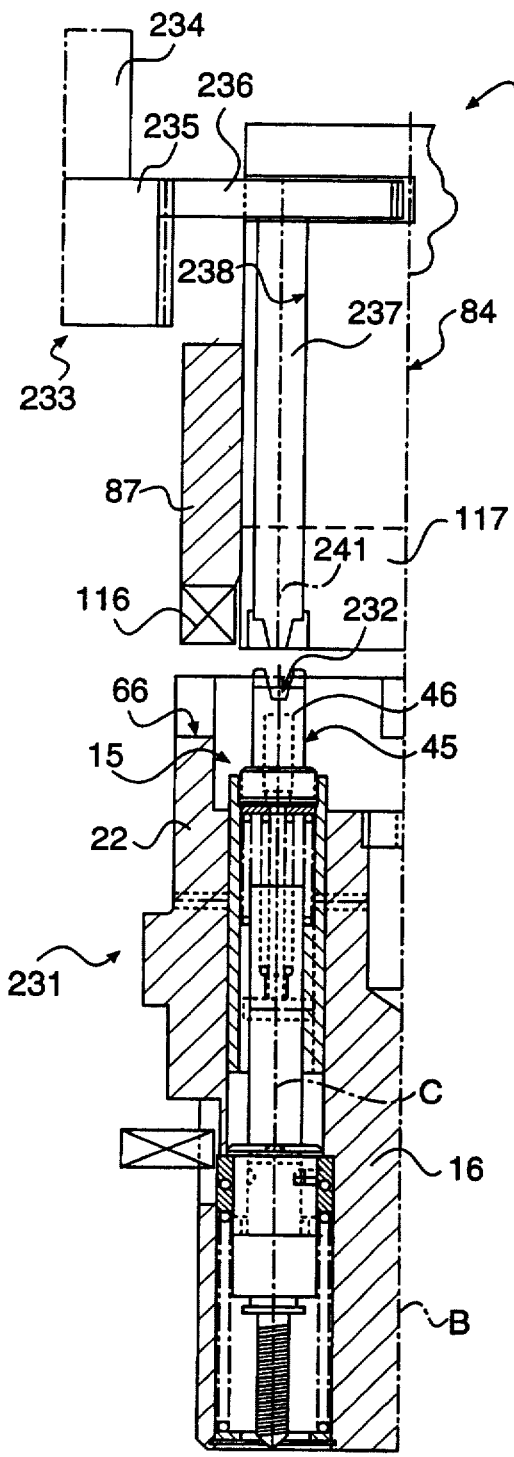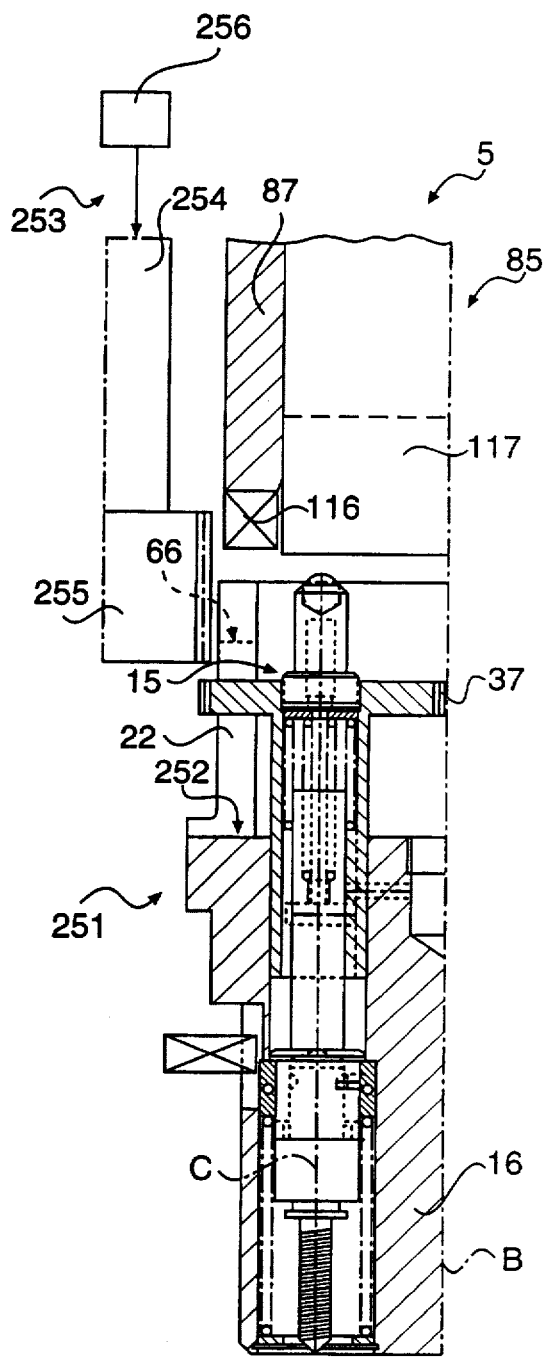
FIG. 11        FIG. 12

5,615,471

1

MACHINE FOR MACHINING SHEET METAL

BACKGROUND OF THE INVENTION

The present invention relates to a machine for machining sheet metal, and in particular to a machine featuring multiple-tool assemblies.

As is known, conventional machines are gradually being replaced by higher-output machines featuring multiple-tool assemblies which comprise a holder supporting a number of punches.

Known machines with multiple-tool assemblies comprise:

a work station in which a striking member is moved along a predetermined axis, and the portion of the member striking the tool operates along a strike axis parallel to the axis of the striking member;

means for transferring the multiple-tool assembly to the work station; and means for rotating the holder of the multiple-tool assembly to align the tool with the strike axis.

A major drawback of machines of the above type is the impossibility of adjusting the point of impact, so that the tools can only be used at the angle they present when aligned with the strike axis.

To orient the tool, some recently designed machines present means for rotating the striking member, and which provide for rotating the holder to orient the tool as required, and for rotating the striking member to bring the strike axis in line with the tool axis.

A major drawback of such machines is the impossibility of accurately adjusting the tool angle, due to the design of the multiple-tool assembly. That is to say, if the assembly presents eight tools, these can only be set to eight angles.

SUMMARY OF THE INVENTION

It is an object of the present invention to provide a machine for machining sheet metal, and which provides for accurately adjusting the tool angle as required.

According to the present invention, there is provided a machine for machining sheet metal, and comprising:

at least one multiple-tool assembly presenting a holder supporting a number of tools arranged in a first ring about a first vertical axis;

at least one multiple-die assembly presenting a holder supporting a number of dies arranged in a second ring also about said first axis;

a work station presenting a hammer movable along a second vertical axis; and a carriage for gripping and moving said sheet;

characterized in that said work station comprises a striker for transmitting to the work tool the pressure exerted by said hammer; and a device for rotating said work tool about a third vertical axis consisting of its own longitudinal axis.

BRIEF DESCRIPTION OF THE DRAWINGS

A preferred, non-limiting embodiment of the present invention will be described by way of example with reference to the accompanying drawings, in which.

2

Figure 2:
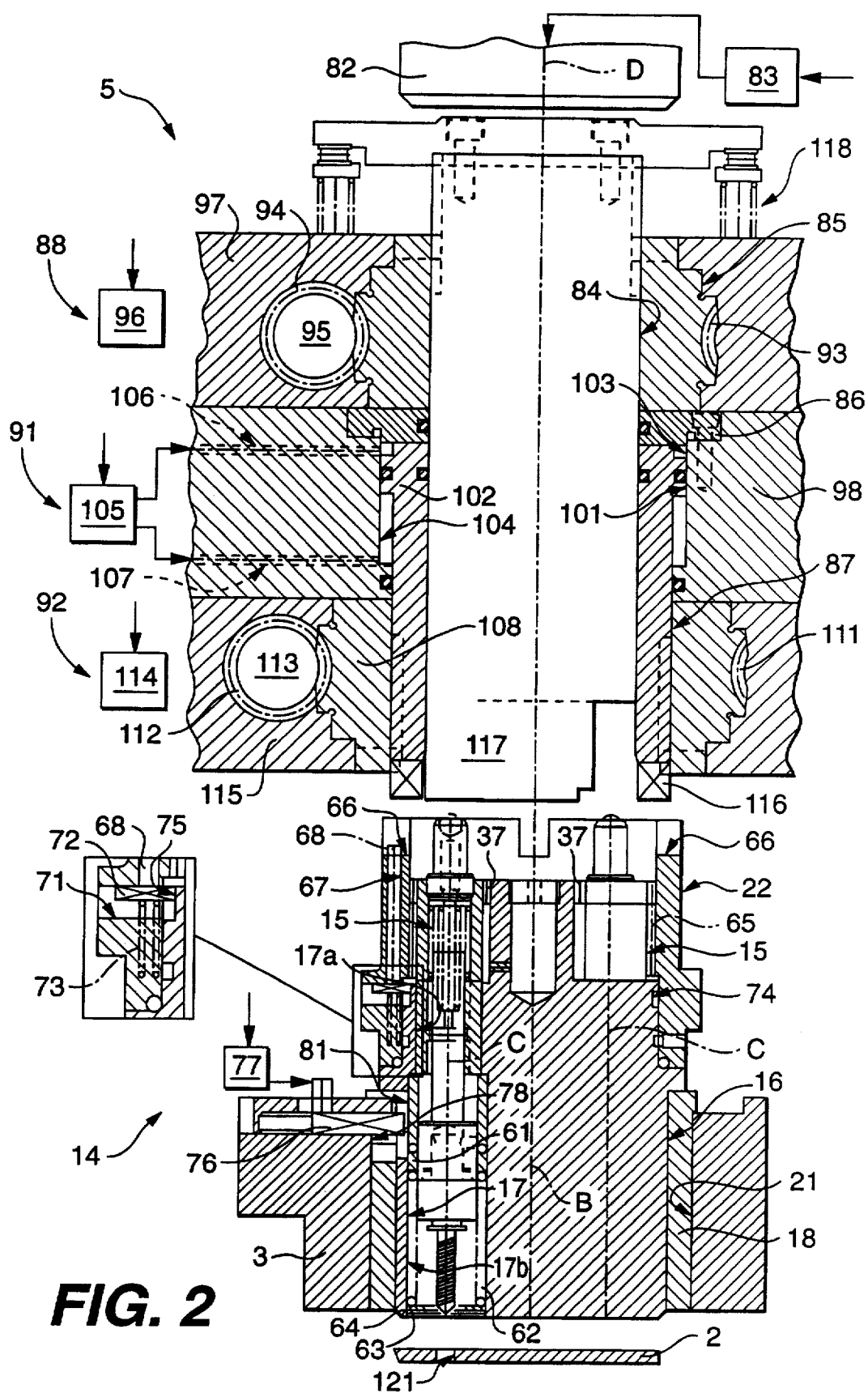
Figure 3:
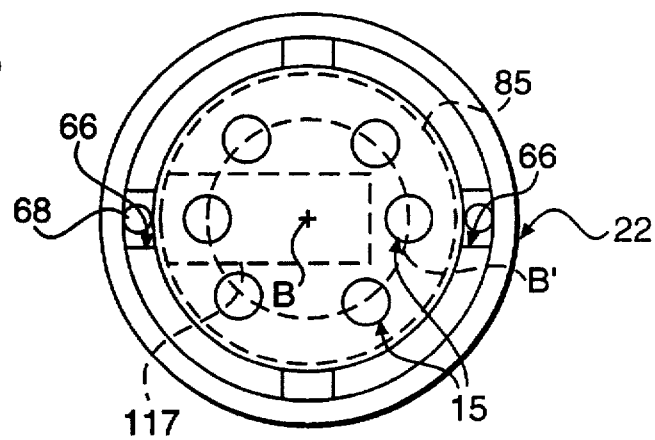
Figure 4:
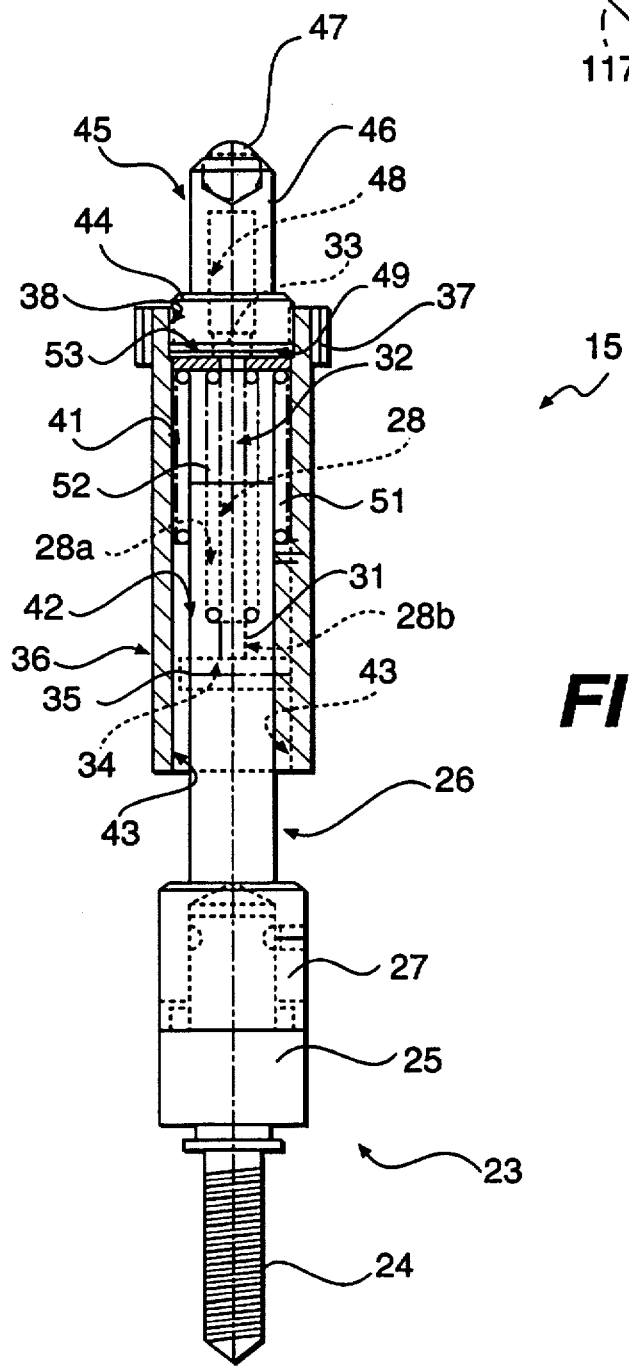
Figure 10:
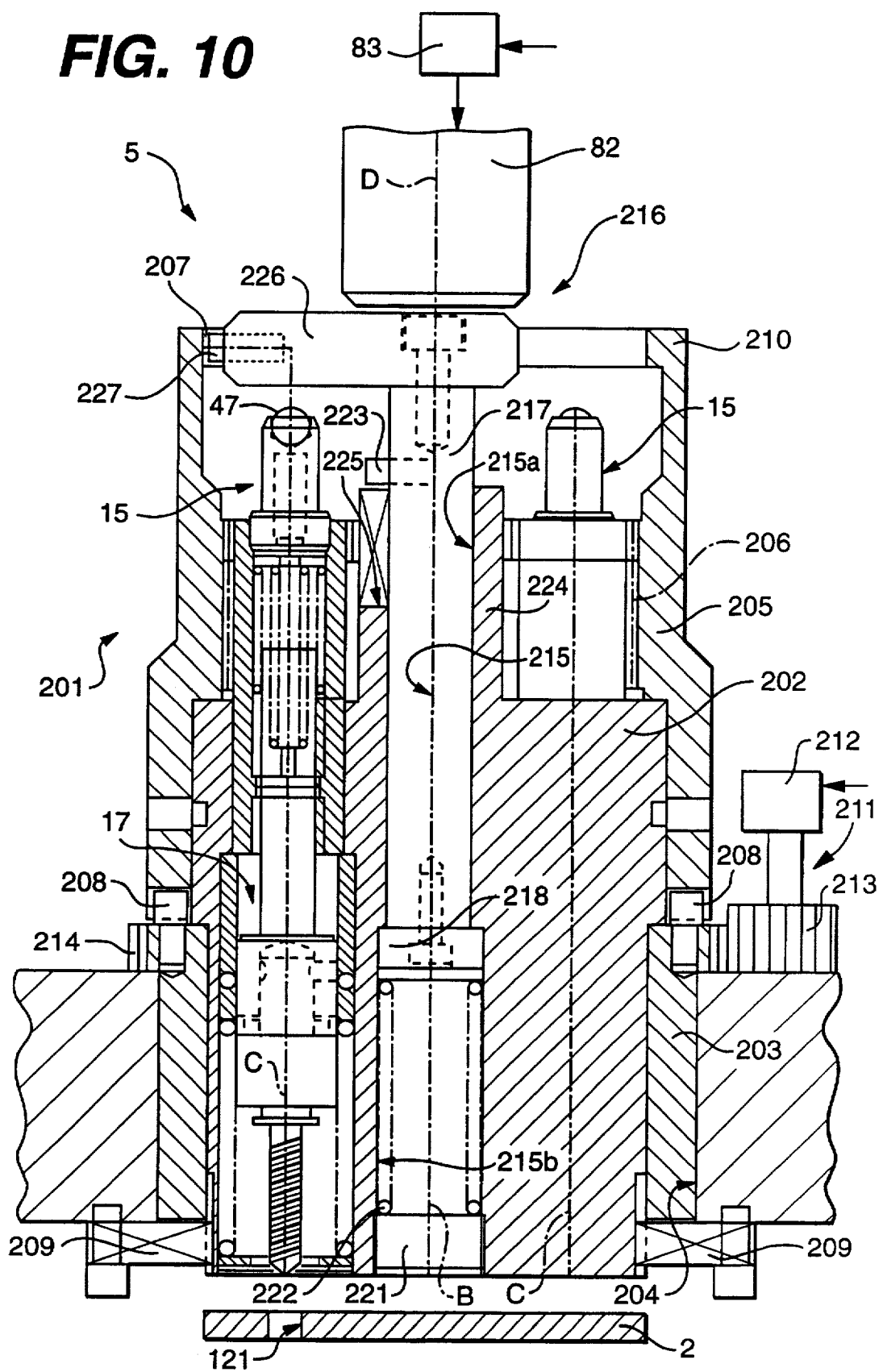

FIG. 2 shows a section of a multiple-tool assembly and tool rotation system;

FIG. 3 shows a plan view of the FIG. 2 multiple-tool assembly;

FIG. 4 shows a section of a threading tool;

FIGS. 5 to 8 show the machining cycle of the FIG. 3 tool;

FIG. 9 shows a partial section of an assembly with at least one punch;

FIGS. 10 to 12 show respective alternative embodiments of the multiple-tool assembly and tool rotation system in FIG. 2.

DETAILED DESCRIPTION OF THE INVENTION

Figure 1:
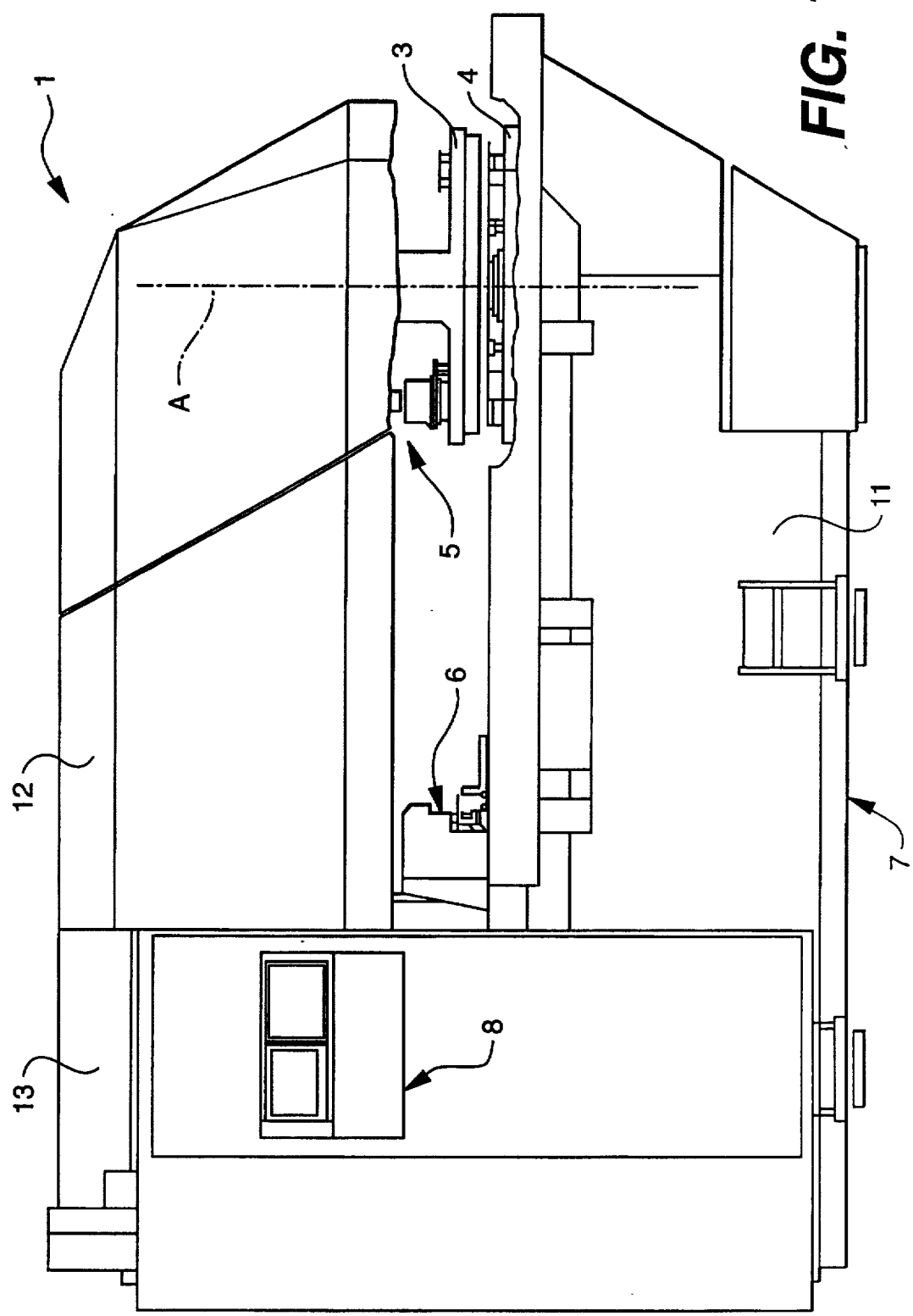
FIG. 1 shows a side view of a machine for machining sheet metal.

Number 1 in FIG. 1 indicates a machine for machining sheet metal 2, and comprising:

a top and bottom cylindrical turret 3 and 4 rotating about and coaxial with each other along a vertical axis A;

a number of multiple-tool assemblies arranged in a ring about the periphery of turret 3;

a number of multiple-die assemblies arranged in a ring about the periphery of turret 4;

a work station 5;

a carriage 6 for gripping and moving sheet 2;

a frame 7 supporting turrets 3 and 4, station 5, and carriage 6; and an electronic control unit 8 for controlling carriage 6, station 5, and the known drive means (not shown) of turrets 3 and 4.

Frame 7 comprises a base 11 supporting turret 4; and an arm 12 supported by base 11 by means of an upright 13 and in turn supporting turret 3 and station 5 which is located peripherally in relation to turrets 3 and 4. The multiple-tool assemblies may present a number of punches, a number of threading tools, or both punches and threading tools.

Number 14 in FIG. 2 indicates a multiple-tool assembly presenting a number of threading tools 15, and comprising a substantially cylindrical holder 16 with a vertical longitudinal axis B. In a ring B' about axis B (FIG. 3), holder 16 presents a number of equally spaced through holes 17, each formed along a respective axis C parallel to axis B, and each housing a respective tool 15. Via the interposition of a sleeve 18, the bottom portion of holder 16 is housed inside a hole 21 formed in turret 3; and the top portion of holder 16 outside hole 21 is fitted with a cylindrical sleeve 22.

With reference to FIGS. 2 and 4, tool 15 comprises a threading member 23 defined by a threading shank 24 and by a tang 25; and a cylindrical bar 26 coaxial and integral with member 23. More specifically, bar 26 presents a bottom portion 27 housing part of tang 25; and the top portion of bar 26 presents a dead axial hole 28 defined by a long top portion 28a, and by a short threaded bottom portion 28b smaller in diameter than portion 28a and inside which is screwed the threaded portion of shank 31 of a screw 32. Screw 32 presents a head 33, and is longer than hole 28 so that head 33 projects from portion 28a. The central portion of bar 26 presents a diametrical through hole 34 engaged by a cylindrical key 35 which is longer than hole 34 so that the ends of key 35 project from hole 34 on either side.

With reference to FIGS. 2 and 4, tool 15 comprises a cylindrical sleeve 36 fitted on to the top portion and part of the central portion of bar 26, and on the outside of the top end portion of which there is formed a straight-toothed gear 37. The through hole defined inside sleeve 36 presents, starting from the top, an internally threaded portion 38; a portion 41 slightly smaller in diameter but longer than portion 38; and a portion 42 smaller in diameter than portion 41. More specifically, portion 42 presents a diameter substantially equal to the outside diameter of the top portion of bar 26; and, along the whole of portion 42, there are formed two diametrically opposed grooves 43, only one of which is shown by the dotted line in that, in all the drawings, tool 15 is sectioned 90°. Inside portion 38 there is screwed the bottom portion 44 of a body 45 which is coaxial with sleeve 36 and presents a top portion 46 in which is formed a seat housing a freely rotating ball 47. A dead axial hole 48, larger in diameter than the width of head 33 of screw 32, is formed along body 45 from portion 44 to just short of the seat of ball 47; and, between portion 44 and the shoulder defined by portions 38 and 41, there is fitted a ring 49 with an inside diameter greater than the diameter of portion 41.

The top portion of the central portion of bar 26 is housed inside portion 42, with the ends of key 35 inside grooves 43 so that bar 26 is angularly integral with but axially movable in relation to sleeve 36; and screw 32 is of such a length that head 33 is housed inside hole 48. Tool 15 also comprises two helical springs 51 and 52; and a washer 53 fitted through with shank 31 of screw 32 and resting on ring 49 and, in certain conditions, on the bottom face of head 33. Spring 51 is mounted between washer 53 and the annular shoulder defined by portions 38 and 41; and spring 52 between washer 53 and the annular shoulder defined by portions 28a and 28b of hole 28.

As shown in FIG. 2, hole 17 presents a top portion 17a, and a bottom portion 17b larger in diameter than portion 17a. Starting from the top, portion 17b is fitted inside with a spacer sleeve 61 with an outside diameter substantially equal to the diameter of portion 17b; a preloaded helical spring 62; a disk 63; and a fixed ring 64 fitted close to the bottom end of portion 17b. At the bottom, spring 62 rests on disk 63 which therefore contacts ring 64; and, at the top, spring 62 rests on the bottom end of sleeve 61, the top end of which therefore rests on the annular shoulder defined by portions 17a and 17b. The inside diameter of sleeve 61 is somewhere between the inside and outside diameters of sleeve 36, so that spring 62 causes sleeve 61 to rest on the bottom end of sleeve 36.

Tool 15 is longer than hole 17, and the components of tool 15 are so sized that, when idle, and by virtue of spring 62, none of the components projects downwards from hole 17, so that the top portion of tool 15 projects outwards of portion 17a of hole 17. Also, the operating travel of tool 15 is such that gear 37 remains outside portion 17a at all times. Sleeve 22 presents a bottom portion which fits on to the top portion of and is axially integral with holder 16; and a top portion, the inner face of which presents straight teeth 65 meshing with gears 37 of all of tools 15.

The top end of sleeve 22 presents two diametrically opposed recesses 66, and, coaxial with one of recesses 66, sleeve 22 presents a hole 67 engaged by a vertical, axially movable pin 68. At the central portion of hole 67, sleeve 22 presents a through opening 71 at which pin 68 is integral with a horizontal key 72; and the portion of hole 67 beneath opening 71 houses a preloaded spring 73 extending into opening 71 and resting on key 72. On a level with opening 71, the lateral surface of holder 16 presents an annular groove 74 slightly wider than the thickness of key 72 to enable it, in certain conditions, to house one end of the key; and, just above a portion of groove 74 facing opening 71, sleeve 22 presents a recess 75 communicating with said portion of groove 74 and, in certain conditions, engaged by said end of key 72.

Pin 68 presents a first axial position wherein its top end projects from hole 67 and is housed inside recess 66, and wherein said end of key 72 engages recess 75 to angularly connect sleeve 22 and holder 16, so that rotation of sleeve 22 about axis B is accompanied by a similar rotation of holder 16. Pin 68 also presents a second axial position into which it is moved, in opposition to spring 73, by the downward pressure exerted by a member described later on, and wherein key 72 is disengaged from recess 75 by being on a level with and, hence, inside groove 74. The second axial position of pin 68 provides for angularly disconnecting sleeve 22 and holder 16, so that, when sleeve 22 is rotated about axis B, tools 15 rotate about respective axes C and holder 16 remains stationary. To ensure holder 16 remains stationary when pin 68 is set to the second axial position, means are provided for securing holder 16 to turret 3 and comprising a horizontal key 76 fitted to turret 3 and movable axially by known means 77 controlled by control unit 8. Key 76 may assume a first axial position wherein, through an opening 78 formed in sleeve 18, one end of key 76 engages a groove 81 formed in the portion of holder 16 housed inside hole 21; and a second axial position wherein key 76 is withdrawn from groove 81 to enable holder 16 to rotate about axis B.

As shown in FIG. 2, station 5 comprises a hammer 82 moved along a vertical axis D by known means 83 controlled by control unit 8. Beneath and coaxial with hammer 82, station 5 comprises an axially movable striker 84 rotatable about axis D and for transmitting to the work tool the pressure exerted by hammer 82. Starting from the top, striker 84 is fitted in succession with an annular body 85 integral with striker 84; a spacer ring 86; and an axially movable sleeve 87 rotatable about axis D. Station 5 also comprises a device 88 for rotating striker 84 about axis D; a device 91 for axially moving sleeve 87; and a device 92 for rotating sleeve 87 about axis D.

With reference to FIG. 2, device 88 comprises a gear 93 formed on the outer face of body 85 and meshing with a gear 94 fitted to the output shaft 95 of an electric motor 96 (shown schematically); body 85 being supported on a plate 97 fitted to arm 12. Device 91 comprises a plate 98 fitted to arm 12 and presenting a through hole 101 housing ring 86 and the top portion of sleeve 87. Ring 86 is integral with plate 98, and the top portion of sleeve 87 presents an annular piston 102 dividing hole 101 into a fluidtight top annular chamber 103 and bottom annular chamber 104. Devie 91 also comprises a hydraulic system 105 controlled by control unit 8; and two conduits 106 and 107 for connecting chambers 103 and 104 to system 105. Device 92 comprises an annular body 108 fitted on to the central portion of sleeve 87 and angularly integral with and axially free in relation to sleeve 87; and a gear 111 formed on the outer face of body 108 and meshing with a gear 112 fitted to the output shaft 113 of an electric motor 114 (shown schematically); body 108 being supported on a plate 115 fitted to arm 12.

With reference to FIG. 2, the bottom end of sleeve 87 presents two diametrically opposed teeth 116 extending downwards and parallel to axis D, and which, in use, engage recesses 66 in sleeve 22 when sleeve 87 is moved down by device 91; and the bottom end of striker 84 presents a rib 117 which is the only part of the striker coming into contact with the head of the work tool. As shown by the dotted line in FIG. 3, rib 117 is shorter than the distance between two diametrically opposed tools 15, and is narrower than the distance between two adjacent tools 15, so that it is only capable of contacting one tool 15 at a time. Finally, work station 5 also comprises elastic means 118 whereby striker 84 is moved into a top limit axial position when hammer 82 is idle.

With reference to FIGS. 2, 5, 6, 7 and 8, in actual use, sheet 2 is first placed between turrets 3 and 4, sheet 2 presenting a through hole 121 formed beforehand by a punch and smaller in diameter than shank 24; and turret 3 is rotated to position a multiple-tool assembly 14 in work station 5 with axis B coaxial with axis D. Sheet 2 is of course positioned with hole 121 coaxial with the selected tool 15.

At this point, device 91 moves sleeve 87 downwards; teeth 116 of sleeve 87 engage recesses 66 as shown in FIG. 6; one of teeth 116 presses pin 68 down into the second axial position wherein sleeve 22 and holder 16 are angularly free; and means 77 are activated to secure holder 16 to turret 3 by means of key 76. Means 83 then move hammer 82 and hence striker 84 downwards so that rib 117 contacts ball 47 of work tool 15, and tool 15 is moved sufficiently along axis C to force the tip of shank 24 into hole 121 in opposition to springs 62 and 52, spring 51 remaining in the original position shown in FIG. 7.

As shown in FIG. 8, by means of device 92, it is now possible to rotate sleeve 87 and hence sleeve 22 equally in a given direction about axis B, D. As sleeve 22 is angularly free in relation to holder 16, rotation of sleeve 22 is accompanied by rotation, in the same direction and about axis C, of sleeve 36, bar 26, and shank 24 which, meshing with the inner walls of hole 121, moves downwards, loading spring 51 and taking bar 26 with it, so as to thread the inner walls of holes 121. Springs 51 and 52 respectively provide for compensating axial extension and contraction of the whole of tool 15, so that each of springs 51, 52, 62 functions independently of the others.

Rotation of sleeve 22 in said given direction terminates upon the end portion of shank 24 issuing from hole 121; and completion of the threading operation may be determined using a sensor, or calculated on the basis of the thickness of sheet 2 and the number of turns of sleeve 87. Upon completion of the threading operation, sleeve 87 is rotated in the opposite direction to withdraw shank 24 from hole 121 without damaging the thread in the hole, and hammer 82 is raised to restore striker 84 to the top limit position via means 118.

As such, a thread may be formed at any point on sheet 2 corresponding to a point along ring B' by positioning sheet 2 so that the axis of hole 121 converges with a given point along ring B'; by moving sleeve 87 downwards by a sufficient amount to engage teeth 116 inside recesses 66, but without moving pin 68 downwards, so that key 72 remains engaged inside recess 75; by releasing key 76 from groove 81 and rotating sleeve 22 and holder 16 to position the selected tool 15 coaxial with hole 121; by rotating striker 84 by means of device 88 to position rib 117 over the selected tool 15; and, finally, by performing the threading operation as described above.

As already stated and shown in FIG. 9, assembly 14 may present at least one punch 122 housed inside hole 17 and comprising a first bar 123 with a punch 124 at the bottom end, and a second bar 125 coaxial with and rigidly connected to bar 123. The whole formed by bars 123 and 125 is housed inside a sleeve 126 presenting a top portion 127 and a bottom portion 128; and the outer face close to the top end of top portion 127 presents a gear 37. Top portion 127 presents an inside and outside diameter larger than those of bottom portion 128, so that two annular shoulders—one inner and one outer—are defined between portions 127 and 128. Bottom portion 128 presents a groove 131 with its axis parallel to axis C and which is engaged by the end of a horizontal key 132 on bar 123 for making bar 123 angularly integral with sleeve 126. Bar 125 presents a bottom portion 133 of the same diameter as bar 123 and housed inside bottom portion 128 of sleeve 126; and a top portion 134 extending upwards beyond the top end of top portion 127 of sleeve 126. The top end of portion 134 is threaded and screwed inside a ring nut 135 with an outside diameter slightly smaller than the inside diameter of top portion 127 of sleeve 126.

As shown in FIG. 9, a preloaded helical spring 137 is fitted about portion 134 of bar 125, between ring nut 135 and a ring 136 resting on the inner shoulder of sleeve 126 and underneath on the annular shoulder defined by portions 133 and 134 of bar 125. Starting from the top, portion 17b of hole 17 is fitted inside with a tubular spacer sleeve 138 with an outside diameter substantially equal to the diameter of portion 17b; a preloaded helical spring 141; a sleeve 142 similar to but shorter than sleeve 138; and a fixed ring 143 fitted close to the bottom end of portion 17b. At the bottom, spring 141 rests on sleeve 142 which therefore contacts ring 143; and, at the top, spring 141 rests on the bottom end of sleeve 138, the top end of which therefore rests on the annular shoulder defined by portions 17a and 17b. The inside diameter of sleeve 138 is somewhere between the inside and outside diameters of portion 127 of sleeve 126, so that, by virtue of spring 141, sleeve 138 rests on the outer annular shoulder of sleeve 126.

Number 151 in FIG. 9 indicates a multiple-die assembly fitted to turret 4 and relative to assembly 14, and comprising a holder 152 fitted with a number of dies 153 arranged in a ring about axis B and each coaxial with a respective tool 15 and 122 on holder 16. Assembly 151 is fitted to turret 4 at a hole 154 formed in turret 4 and presenting a bottom portion 154a seating a cylinder 155 which is movable axially by a device 156 (shown schematically) similar to device 91, and is rotatable about axis B by a device 157 (shown schematically) similar to device 92. Holder 152 is defined by a substantially cylindrical body presenting a number of through holes 158, each seating a respective die 153; and, from the bottom face of holder 152, there extends downwards an annular projection 161 housed inside portion 154b of hole 154 via the interposition of an annular plate 162 resting on the annular shoulder defined by portions 154a and 154b.

As shown in FIG. 9, die 153 is defined by two annular bodies 163 and 164 coaxial and angularly integral with each other, and respectively extending upwards beyond the top face of holder 152, and downwards beyond the bottom face of holder 152. The portion of body 164 outside hole 158 presents a straight-toothed gear 165; and, between the bottom face of holder 152 and the top face of plate 162, there is fitted an annular plate 166, the inner face of which presents teeth meshing with all of gears 165. Plate 166 is fitted inside the space enclosed by annular projection 161; and the face of plate 166 facing inwards of portion 154a presents two diametrically opposed recesses 167 which, when cylinder 155 is raised, are engaged by two diametrically opposed teeth 168 formed on the top face of cylinder 155. At one of recesses 167, plate 166 presents a vertical through hole 171 along which vertical pin 172 slides axially, and which is coaxial with a dead hole 173 formed in holder 152.

As shown in FIG. 9, hole 173 houses a second pin 174 pushed downwards by a preloaded spring 175 into contact with pin 172 which comprises a head portion 176 larger in diameter than hole 173, and a bottom portion 177 housed in hole 171. When idle, and by virtue of spring 175, the end of bottom portion 177 extends inside recess 167. At hole 173, the bottom face of holder 152 presents a recess 178 which, in certain operating conditions, is engaged by the central portion 176 of pin 172.

As shown in FIG. 9, pin 172 presents a first axial position wherein the bottom end of pin 172 is outside hole 171 and therefore inside recess 167, and central portion 176 is outside recess 178 and housed in the top portion of hole 171; which first axial position of pin 172 provides for angularly disconnecting holder 152 and plate 166, so that, when plate 166 is rotated about axis B, die 153 is rotated about respective axis C and holder 152 remains stationary. Pin 172 also presents a second axial position into which it is moved, in opposition to spring 175, by the upward pressure exerted by tooth 168, and wherein portion 176 engages recess 178 and pushes pin 174 upwards; which second axial position of pin 172 provides for angularly connecting holder 152 and plate 166, so that rotation of plate 166 about axis B is accompanied by a similar rotation of holder 152.

As shown in FIG. 9, to ensure holder 152 remains stationary when pin 172 is set to the first axial position, means are provided for securing holder 152 to turret 4 and comprising a horizontal key 181 fitted to turret 4 and movable axially by known means 182 controlled by control unit 8. Key 181 may assume a first axial position wherein one end engages a groove 183 formed in holder 152; and a second axial position wherein it is withdrawn from groove 183 to enable holder 152 to rotate about axis B.

In actual use, sheet 2 is so positioned that the portion of the sheet to be punched corresponds with a punching axis converging with a point along ring B'; by means of device 91, sleeves 87 and 22 are connected angularly, and holder 16 is released angularly from sleeve 22 by means of pin 68; holder 16 is made angularly integral with turret 3 via means 77; by means of device 92, tool 122 is rotated about respective axis C to a predetermined cutting angle; holder 16 is disconnected angularly from turret 3 via means 77, and is made angularly integral with sleeve 22 by moving sleeve 87 slightly upwards; and, by means of device 92, holder 16 is rotated to position tool 122 coaxial with the punching axis.

The above operations are also performed on die assembly 151. That is, turret 4 is rotated to bring the die assembly 151 relative to tool assembly 14 into work station 5; the tool is rotated about axis C; holder 152 is rotated to position die 153 coaxial with the punching axis; by means of device 88, striker 84 is rotated to position rib 117 over the selected tool 122; and hammer 82 is moved downwards via means 83, so as to move tool 122 downwards, via striker 84, by a sufficient amount to punch sheet 2. It should be pointed out that, though similar to die 153, the die relative to tool 15 presents no gear 165 in that body 163 presents a circular hole and therefore does not need to rotate. Obviously, to thread hole 121, the die must be positioned coaxially with tool 15 as described above relative to die 153.

FIG. 10 shows an alternative embodiment of the present invention, wherein 201 indicates a multiple-tool assembly presenting at least one tool 15 and at least one tool 122 (not shown). Assembly 201 comprises a holder 202 similar to holder 16 and presenting, in a ring B' about axis B, a number of through holes 17 similar to and for the same purpose as holes 17 of assembly 14. The bottom portion of holder 202 is housed, via the interposition of a cylindrical sleeve 203, inside a hole 204 formed in turret 3; and the top portion of holder 202 outside hole 204 is fitted with a cylindrical sleeve 205. Unlike holder 16, holder 202 is secured to turret 3 by two keys 209 for preventing it from rotating about axis B. Sleeve 205 presents a bottom portion fitted on to the top portion of and axially integral with holder 202; and a top portion, the inner face of which presents straight teeth 206 meshing with gears 37 of all of tools 15. The top end of sleeve 205 presents an inner annular projection 210, a given portion of which presents a vertical through recess 207 open at the front; and, by means of screws 208, sleeve 205 is made angularly integral with sleeve 203 which is rotated about axis B by a device 211 controlled by control unit 8.

With reference to FIG. 10, device 211 comprises an electric motor 212, the output shaft of which is fitted with a gear 213 meshing with a gear 214 formed on the top portion, outside hole 204, of sleeve 203. Holder 202 presents a through hole 215 presenting axis B and defined by a top portion 215a, and by a bottom portion 215b larger in diameter than portion 215a. In place of striker 84 in FIG. 2, assembly 201 presents a striking device 216 comprising a vertical bar 217 housed in portion 215a and presenting a wide bottom portion 218 housed in portion 215b. Device 216 also comprises a threaded ring nut 221 screwed into a threaded bottom end portion of portion 215b; and a preloaded helical spring 222 fitted between ring nut 221 and portion 218. The top portion of bar 217 is fitted with a horizontal key 223; and, from the top face of holder 202, there extends a tubular body 224 housing part of bar 217. The top end of body 224 presents a through recess 225 which is also open at the top and which, in certain conditions, is engaged by key 223. The top end of bar 217 extends beyond body 224 and supports a rib 226 similar to rib 117.

Rib 226 is defined by a body extending radially in relation to axis B, and which is shorter than the inside diameter of projection 206, and narrower than the distance between two adjacent tools 15. The end of rib 226 supports a horizontal key 227 designed, in certain conditions, to engage recess 207; and rib 226 is pressed downwards by hammer 82.

When idle, spring 222 causes device 216 to assume a top limit position wherein key 227 engages recess 207, and key 223 is disengaged from recess 225, so that, when sleeve 203 is rotated about axis B by device 211, rib 226 is rotated equally by being angularly connected to sleeve 205.

When rib 226, and hence bar 217, is moved sufficiently by hammer 82 to release key 227 from recess 207 and engage key 223 in recess 225, this provides for angularly disconnecting rib 226 and sleeve 205, and for angularly connecting rib 226 and holder 202, so that rotation of sleeve 203 causes tools 15 and 122 to rotate about respective axis C.

With reference to FIG. 10, in actual use, sheet 2 with through hole 121 is first placed between turrets 3 and 4; and turret 3 is rotated to position a multiple-tool assembly 201 in work station 5 with axis B coaxial with axis D. Sheet 2 is of course positioned so that hole 121 is coaxial with the selected tool 15. At this point, rib 226 is rotated by device 211 so that it corresponds with ball 47 of the selected tool 15; via means 83, hammer 82 and rib 226 are moved down so as to move tool 15 sufficiently along axis C to force the tip of shank 24 inside hole 121; and, by means of device 211, sleeve 205 is rotated in a given direction about axis B, D, thus rotating, in the same direction and about axis C, sleeve 36, bar 26, and shank 24 which, meshing with the inner walls of hole 121, moves downwards, taking bar 26 with it, to thread the inner walls of hole 121.

To punch sheet 2, this is positioned so that the portion of the sheet to be punched corresponds with a punching axis converging with a point along ring B'; rib 226 is rotated by device 211 so that it corresponds with the head of the selected tool 122; via means 83, hammer 82 and rib 226 are moved so as to disconnect rib 226 from sleeve 205 and angularly connect rib 226 to holder 202; tool 122 is rotated by device 211 to the predetermined cutting angle; and hammer 82 is moved further to punch sheet 2. Assembly 201 may be operated in conjunction with a die assembly similar to assembly featuring means for rotating the dies.

FIG. 11 shows a partial view of a further embodiment of the present invention, wherein 231 indicates a multiple-tool assembly presenting at least one tool 15 and at least one tool 122 (not shown). Being similar to assembly 14, assembly 231 is indicated using the same numbering system, and differs from assembly 14 solely as regards the following characteristics: no teeth 65 are provided on the inner face of sleeve 22; no pin 68-key 72 assembly is provided; sleeve 22 is formed in one piece with holder 16; in place of ball 47, tool 15 presents an open-top recess 232 in portion 46 of body 45; and no gear 37 is provided on tool 15. Work station 5 in FIG. 11 presents devices 88, 91 and 92 (therefore not shown), but, unlike the FIG. 2 station, comprises a device 233 for rotating work tool 15 about respective axis C and in turn comprising an electric motor 234 controlled by control unit 8 and the casing of which is fitted to striker 84 in a manner not shown. The output shaft of motor 234 is fitted with a straight-toothed gear 235 meshing with a straight-toothed gear 236 fitted to a rotary shaft 237 in turn fitted inside a hole 238 formed in striker 84 up to rib 117. The bottom end of shaft 237 presents a tip 241 designed, in certain conditions, to engage recess 232, and which is housed inside hole 238, and more specifically inside the bottom end portion of hole 238, which is wider than portion 46 of body 45.

With reference to FIG. 11, once sleeve 87 is moved down by device 91, holder 16 is rotated by device 92 to position the selected tool 15 coaxial with hole 121; striker 84, taking motor 234 with it, is rotated by device 88 to position rib 117 over the selected tool 15, and more specifically to position shaft 237 coaxial with tool 15; striker 84 is moved down so as to move tool 15 sufficiently along axis C to force the tip of shank 24 inside hole 121, during which movement of striker 84, part of portion 46 is inside said end portion of hole 238, and tip 241 is inside recess 232; and device 233 provides for rotating, about axis C, sleeve 36, bar 26, and shank 24 which, meshing with the inner walls of hole 121, moves downwards, taking bar 26 with it, to thread the inner walls of hole 121.

To punch sheet 2, this is positioned so that the portion of the sheet to be punched corresponds with a punching axis converging with a point along ring B'. Naturally, the head of tool 122 presents the same design as body 45 in FIG. 11. At this point, via means 83, hammer 82 and striker 84 are moved so as to angularly connect shaft 237 and body 45; by means of device 233, tool 122 is rotated to the predetermined cutting angle; by means of device 88, rib 117 is rotated so that it corresponds with the punching axis; by means of devices 91 and 92, sleeves 87 and 22 are first connected angularly, and holder 16 then rotated to position the selected tool 122 coaxial with the punching axis; and hammer 82 is moved further to punch sheet 2.

FIG. 12 shows a partial view of a further embodiment of the present invention, wherein 251 indicates a multiple-tool assembly presenting at least one tool 15 and at least one tool 122 (not shown). Being similar to assembly 14, assembly 251 is indicated using the same numbering system, and differs from assembly 14 solely as regards the following characteristics: no teeth 65 are provided on the inner face of sleeve 22; no pin 68-key 72 assembly is provided; sleeve 22 is formed in one piece with holder 16; at each gear 37, sleeve 22 presents a through recess 252, and gear 37 is of such a diameter as to present a portion projecting from sleeve 22 through respective recess 252. Work station 5 in FIG. 12 presents devices 88, 91 and 92 (therefore not shown), but, unlike the FIG. 2 station, comprises a device 253 for rotating work tool 15 about respective axis C and in turn comprising an electric motor 254 controlled by control unit 8 and the casing of which is fitted to striker 84 in a manner not shown. Motor 254 is movable along a vertical axis by known means 256 (shown only schematically). The output shaft of motor 254 is fitted with a straight-toothed gear 255 which, when idle, is located above gear 37, and which, in certain conditions, meshes with gear 37 of selected tool 15.

With reference to FIG. 12, once sleeve 87 is moved down by device 91, holder 16 is rotated by device 92 to position the selected tool 15' coaxial with hole 121; striker 84, taking motor 254 with it, is rotated by device 88 to position rib 117 over the selected tool 15; striker 84 is moved down so as to move tool 15 sufficiently along axis C to force the tip of shank 24 inside hole 121; motor 254 is moved down so that gear 255 meshes with gear 37; and device 253 provides for rotating, about axis C, sleeve 36, bar 26, and shank 24 which, meshing with the inner walls of hole 121, moves downwards, taking bar 26 with it, to thread the inner walls of hole 121.

To punch sheet 2, this is positioned so that the portion of the sheet to be punched corresponds with a punching axis converging with a point along ring B'; via means 83, hammer 82 and striker 84 are moved so as to mesh gears 255 and 37; by means of device 253, tool 122 is rotated to the predetermined cutting angle; by means of device 88, rib 117 is rotated so that it corresponds with the punching axis; by means of devices 91 and 92, sleeves 87 and 22 are first connected angularly, and holder 16 then rotated to position the selected tool 122 coaxial with the punching axis; and hammer 82 is moved further to punch sheet 2.

The advantages of the present invention will be clear from the foregoing description.

In particular, it provides for a sheet metalworking machine featuring a multiple-tool assembly and a system for rotating the tool about its longitudinal axis, thus enabling the same multiple-tool assembly to be fitted with both threading tools requiring rotation means, and adjustable-angle punches. Moreover, the machine may be fitted with a system for rotating the tool holder, and with a system for rotating the body exerting pressure on the tool, thus greatly increasing the versatility of the machine as compared with known types, by enabling adjustment not only of the machining axis but also, in the case of punching operations, of the punch angle. What is more, adjustment of the punching axis and the punch angle is extremely accurate.

Clearly, changes may be made to machine 1 as described and illustrated herein without, however, departing from the scope of the present invention.

In particular, in place of the rotary turrets, the machine may feature fixed turrets fitted with a single multiple-tool assembly and corresponding multiple-die assembly; and the multiple-tool assemblies with rotary holders may present a greater number of recesses 66 for increasing the points at which to angularly connect sleeves 87 and 22.

I claim:

1. A machine for machining a metal sheet said machine comprising:

a top and bottom cylindrical turret rotating about and coaxial with each other along a first vertical axis;

plurality of multiple-tool assemblies arranged in a ring about the periphery of said top turret, each multiple-tool assembly rotatable about a second vertical axis;

a plurality of multiple-die assemblies arranged in a ring about the periphery of said bottom turret, each multiple-die assembly rotatable about the second vertical axis;

a work station including a hammer movable along the second axis; and an electronic control unit for controlling a carriage for gripping and moving said metal sheet, a means for driving said turrets, a means for driving said multiple-tool and multiple-die assemblies, and a means for driving said work station;

wherein at least one of said tools of said multiple-tool assemblies is a punch tool and at least one of said tools of said multiple-tool assemblies is a threading tool for internally threading a hole formed in said sheet;

wherein said work station comprises a striker for transmitting to a work tool the pressure exerted by said hammer and wherein a plurality of devices for rotating said at least one punch tool and at least one threading tool about a third vertical axis is provided.

2. A machine as claimed in claim 1, wherein the holder of said multiple-tool assembly presents, in said first ring, a number of equally spaced first through holes, each seating a respective said tool; said first holes being formed along a respective said third axis parallel to said first axis, and being defined by a top portion and a bottom portion larger in diameter than said top portion.

3. A machine as claimed in claim 1, wherein said at least one threading tool comprises:

a threading member;

a first bar coaxial with, and presenting a bottom portion integral with, said threading member;

a first sleeve fitted on to the top portion and on to part of the central portion of said first bar, and angularly integral with but axially free in relation to said first bar;

a first tubular spacer housed in said bottom portion of said first hold;

a first body integral with the top end of said first sleeve and extending upwards beyond said first hole;

first spring means fitted between said first body and an inner shoulder formed in said first sleeve;

second spring means fitted between said first body and said first bar; and third spring means fitted between said first spacer and a ring fitted close to the bottom end of said bottom portion of said first hole.

4. A machine as claimed in claim 1, wherein said at least one punch tool comprises:

a second bar, the bottom end of which presents a punch;

a third bar coaxial with and rigidly connected to said second bar, and presenting a top portion extending upwards beyond said first hole;

a second sleeve housing the whole defined by said second and third bars, and angularly integral with but axially free in relation to said second bar;

a second tubular spacer housed in said bottom portion of said first hole;

fourth spring means fitted between said top portion of said third bar and an inner shoulder formed in said second sleeve; and fifth spring means fitted between said second spacer and a ring fitted close to the bottom end of said bottom portion of said first hole.

5. A machine as claimed in claims 1, 2, 3, or 4, wherein said holder of said multiple-die assembly presents, in said second ring, a number of equally spaced second through holes, each seating a respective said die; said second holes being formed along a respective said axis coaxial with said third axis of the corresponding said tool.

6. A machine as claimed in claim 5, further comprising a device for rotating said dies corresponding to said punches about their respective axes.

7. A machine as claimed in claims 1, 2, 3, or 4, wherein said holder of said multiple-tool assembly presents a third sleeve extending upwards; and further comprising a device for rotating said third sleeve about said first axis.

8. A machine is claimed in claim 3, wherein the portion of said first sleeve and of a second sleeve extending upwards beyond said first hole presents a respective first straight-toothed gear.

9. A machine as claimed in claim 8, wherein a third sleeve is angularly integral with said holder of said multiple-tool assembly; and said first gears extend outwards of said third sleeve; said device for rotating said work tool about said third axis comprising an electric motor, the output shaft of which is fitted with a second straight-toothed gear meshing, in certain conditions, with said first gear of said work tool.

10. A machine as claimed in claim 7, wherein said third sleeve is angularly integral with said holder of said multiple-tool assembly; and said first body of said threading tool and said top portion of said punch present a respective first recess; said device for rotating said work tool about said third axis comprising an electric motor for rotating a rotary shaft, the bottom end of which presents a tip engaging, in certain conditions, said first recess.

11. A machine as claimed in claim 9, wherein the inner face of said third sleeve presents straight teeth meshing with all of said first gears; and further comprising a device for angularly connecting and disconnecting said holder of said multiple-tool assembly and said third sleeve.

12. A machine as claimed in claim 7, wherein said multiple-die assembly presents a device for rotating its holder about said first axis.

13. A machine as claimed in claims 1, 2, 3, or 4, wherein said striker comprises a rib designed, by virtue of said hammer to press said work tool downwards; and further comprising a device for controlling the angular position of said rib about said first axis.

* * * * *

UNITED STATES PATENT AND TRADEMARK OFFICE
CERTIFICATE OF CORRECTION

PATENT NO. : 5,615,471
DATED : April 1, 1997
INVENTOR(S) : Eugenio PERAZZOLO

It is certified that error appears in the above-indentified patent and that said Letters Patent is hereby corrected as shown below:

Abstract, Title Page, last line, change "is" to --its--.

Claim 1, col. 10, line 59, before "said" insert --,--; and
line 63, before "plurality" insert --a--.

Claim 5, col. 12, line 10, "1" should read in bold.

Signed and Sealed this

Eighth Day of July, 1997

Attest:

BRUCE LEHMAN

*Attesting Officer*          *Commissioner of Patents and Trademarks*